Dec. 28, 1937.  F. B. YINGLING  2,103,604
INTERNAL COMBUSTION ENGINE
Filed June 19, 1936   2 Sheets-Sheet 2

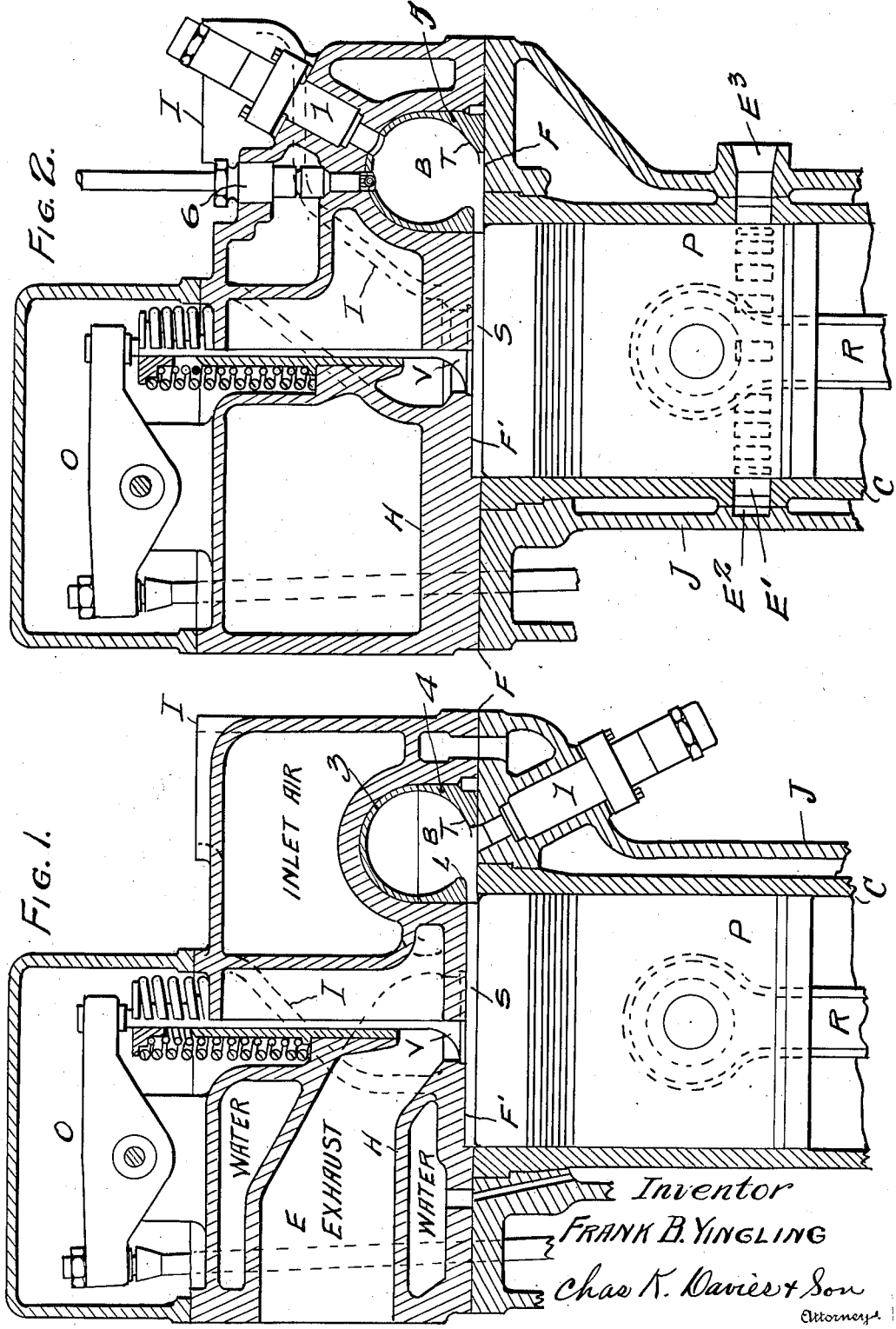

Inventor
FRANK B. YINGLING
By Chas. K. Davies & Son
Attorneys

Patented Dec. 28, 1937

2,103,604

UNITED STATES PATENT OFFICE 2,103,604

INTERNAL COMBUSTION ENGINE

Frank B. Yingling, Hamilton, Ohio, assignor to Cyrus J. Fitton, Hamilton, Ohio

Application June 19, 1936, Serial No. 86,174

2 Claims. (Cl. 123—32)

The present invention relates to improvements in internal combustion engines of the Diesel type, operating on the fuel oil injection, compression ignition principle, and in which the precombustion chamber is employed in connection with the engine cylinder, to insure a thorough commingling of the fuel oil with the charge of air; to accomplish immediate and uniform distribution of the ignited charge throughout the combustion chamber of the engine cylinder; and to produce, substantially a complete combustion of the fuel charge, generating regulated pressures.

The present application is a continuation in part of the application filed by me March 5, 1935, Serial Number 9,452.

In carrying out my invention I locate the precombustion chamber in the engine head in the closest practicable relation to the cylinder for maximum uniformity in the distribution of the fuel charge throughout the area of the combustion chamber of the cylinder, thereby enhancing the operation and the efficiency of the engine with a minimum compression of the air and the fuel oil to create combustion and a high temperature in the combustion chamber, together with prompt and complete combustion ignition of the fuel charge, generating controlled pressure on the piston for a longer portion of the power stroke, producing maximum power with a lower pressure.

In combination with the precombustion chamber in the engine head I provide a novel construction in the inner or under face of the engine head, which is recessed, or countersunk, to form an end of the cylinder, and the space provided in this recess alternates in the formation of an air-compression space and the combustion chamber of the cylinder. This novel formation of the engine head and its inner or under face materially simplifies the manufacture of parts of multi-cylinder engines; permits facile and accurate adjustment and assembly of the parts of the engine; and permits ready removal of the engine head together with free access to the working parts of the engine when the head is removed from the engine block, or from the body of the engine that includes the cylinders.

Both the recess and chamber located in the engine head are beyond the dead center position of the piston on its out stroke, and therefore the recess and chamber are in open and unobstructed but restrained communication with one another at all times regardless of the position of the piston which reciprocates in the cylinder.

At the present time high speed engines with precombustion chambers confine practically all of the air in the precombustion chamber thereby producing a quick burning of the fuel, and resulting in a high speed engine.

The larger slow-speed engines confine the combustion to the cylinder which tends to retard the combustion and follow up, prolonging the pressure on the piston.

In the medium-speed engine made according to my present invention, the power plant may have the combination of cylinder air and precombustion chamber air in proportion to produce the most advantageous results for the cylinder-diameter, stroke, and speed of the engine.

The combustion, of course, begins in the precombustion chamber and the air therein is saturated with fuel oil. As the combustion proceeds it is forced into the cylinder air and finds a supply of oxygen to complete the combustion and thorough burning of the fuel, producing more power at lower pressure for a larger portion of the piston stroke, preventing smoke, and causing the engine to operate at a higher degree of efficiency. The mixture of burning oil and air is not forced out on the piston, but over the top thereof, thereby causing a reduction in the temperature on top of the piston, and preventing "hot spots".

In the accompanying drawings I have illustrated two embodiments of my invention, one in a four-cycle engine and the other in a two-cycle engine, and while I have illustrated only one cylinder and accessories, it will be apparent that the invention is to be applied to a multi-cylinder engine.

The invention consists in certain novel combinations and arrangements of parts as will be hereinafter more fully set forth, but it will be understood that the exemplifying drawings, or structures, may be changed or altered, within the scope of my appended claims, without departing from the principles of my invention.

Figure 1 is a vertical sectional view of part of a four-cycle engine constructed according to my invention, showing a two-piece liner in the precombustion chamber, and with the piston at its top dead center.

Figure 2 is a similar view of a two-cycle engine according to my invention, showing a one-piece liner in the precombustion chamber.

In order that the general relation and utility of parts may readily be understood I have illustrated a four-cycle engine in Figure 1 and a two-cycle engine in Figure 2 each having the usual reciprocating piston P and its connecting rod D, together with the cylinder C; the upper end or face of the cylinder being flush with the upper face of the engine block or body of the engine, of which the jacket J forms a part. At its dead center on the out stroke of the piston, the face of the piston is approximately flush with the top edge of the cylinder and engine block.

The removable engine head H is mounted above the engine block, and the under or inner face F of the engine head rests on the face of the block, the usual gasket being interposed between these parts in the assembly of the engine.

Figure 3:
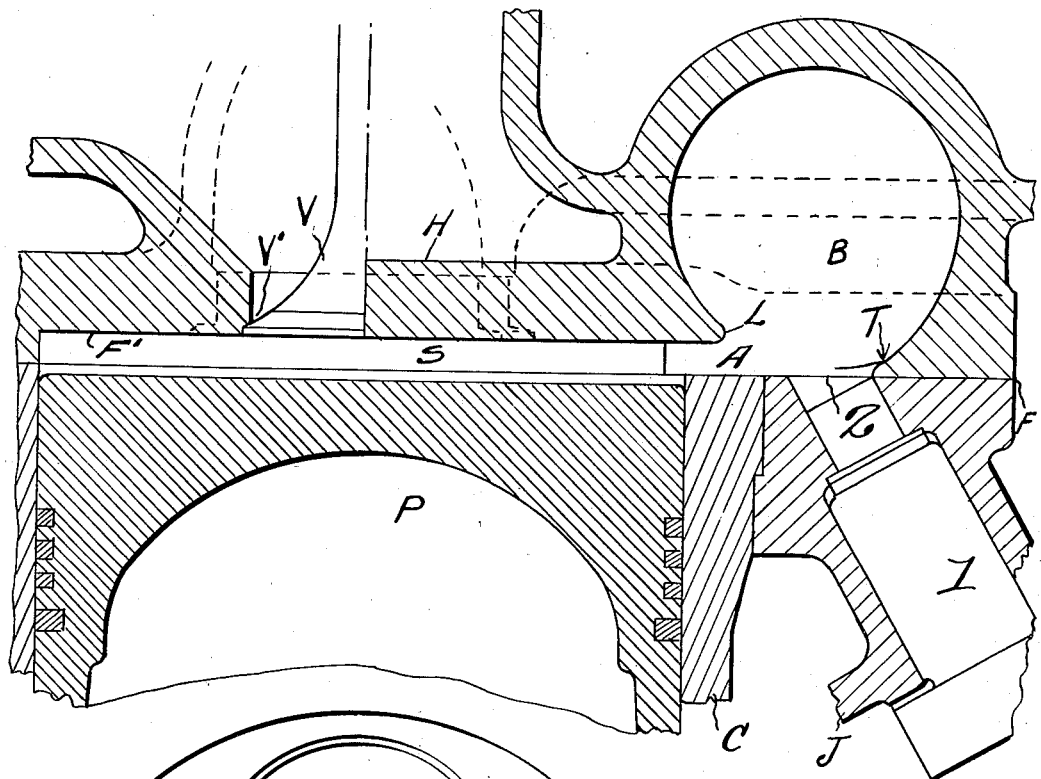
Figure 3 is an enlarged, detail sectional view of parts of Figure 1, but showing the precombustion chamber without a liner, and the piston approaching its dead center position.
Figure 4:
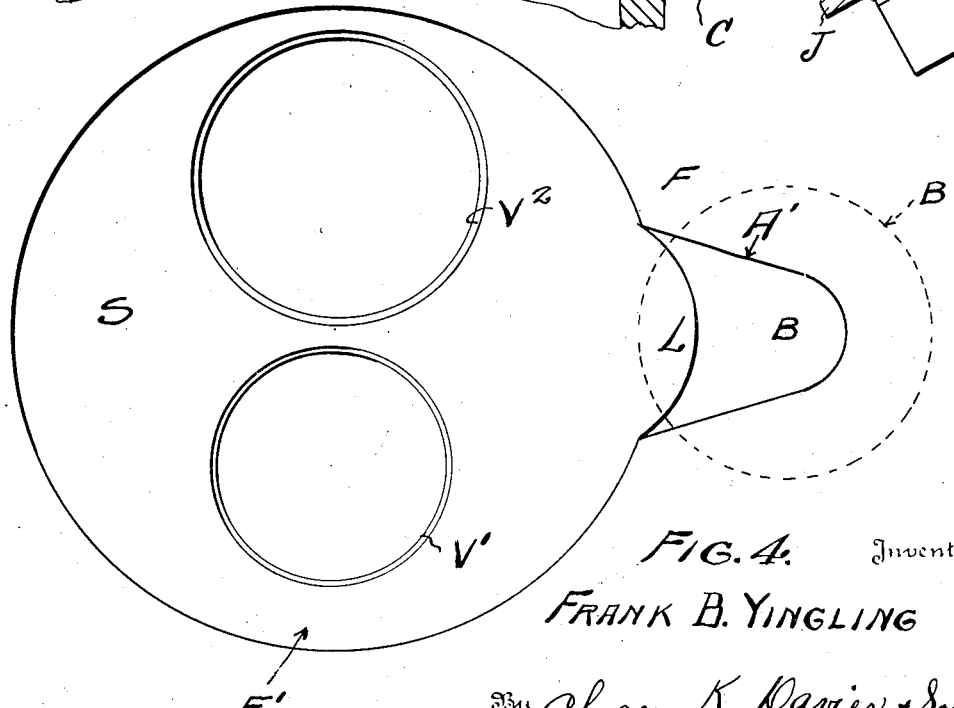
Figure 4 is a detail, inverted plan view, showing a portion of the under face or inner face of the engine-head and disclosing the recessed and chambered head, together with the valve seats in the head.

As best seen in Figures 3 and 4 the face F of the engine head is countersunk, or fashioned with a circular recess S which forms an extension or continuation of the cylinder C, and the depressed face F" of this recess forms the head of the cylinder C, which head is clearly shown as elevated above the top face of the piston when the latter occupies the dead center of its out stroke.

In the four cycle engine of Figure 1, successive charges of air are supplied to the cylinder C through valve seat V' of the valve V from the intake manifold I of the engine head, and passage of exhaust gases from the cylinder as controlled by the overhead exhaust valve, the valve operating mechananism being indicated at O. In the four cycle engine of Figure 1, a down stroke of the piston draws in an air charge through the air inlet I, the up stroke compresses the charge of air, the next down stroke is the power stroke, and the next up stroke is the scavenger stroke which forces the spent gas through the exhaust passage E.

On the compression stroke of the piston, air is compressed into the compression space S and thence, laterally, through a shallow, horizonally extending, tapered, restricted passage A, rectangular in cross section, and formed by the aperture A' in the engine head and opening into the chamber B. The lower wall of the passage A is the top face F of the engine head, and a lobe L fashioned as part of the depressed face F" of the engine head, projects into the chamber B and forms a partial wall at the top of the passage. As indicated in Figure 4, the somewhat triangular shaped aperture A' has its walls flaring outwardly to the circular wall of the compression space S, and it will be apparent that the compression stroke of the piston, in forcing the air through this space and the passage A, concentrates the charge of air as it sweeps through the narrowing passage into the chamber B. In moving in the opposite direction, the fuel charge sweeps laterally but under restraint through the outwardly flaring pasage A into the space S, which space becomes the combustion chamber, and the fuel charge is widely distributed, laterally or horizontally, across the top face of the piston but is restricted by the size and shape of the passage and thereby controls the intensity of the combustion and the time period and the pressure.

This direct transfer of a charge of air, under high compression, in the form of a sweeping stream or current, is guided as it enters the precombustion chamber B by the tangentially arranged face T on the wall of the precombustion chamber B, to form a spiral, swirling, turbulency within the chamber, and the fuel oil is injected into the turbulent charge of air and atomized or vaporized under compression, thereby producing a condition which insures prompt and complete combustion.

The oil injector, indicated as 1 in Figure 1, it will be noted, is located in the jacket of the engine block, and oil is injected into the chamber B through port 2 fashioned in the face F of the engine block or jacket. The charge of oil from the injector enters the precombustion chamber and tends to swirl in the chamber in a direction opposite to the swirling movement of the compressed air, and as a result, the meeting of these two currents enhances the turbulency of the precombustion chamber and insures substantially complete atomization or vaporization of the oil as it is commingled with the air charge. A maximum mixing and commingling of the oil and air is assured in the precombustion chamber by timing the starting of the injection of the oil to take place just previous to the arrival of the piston at its outer dead center of its compression stroke and continues for several degrees of rotation of the camshaft to inject the required amount of fuel oil for combustion to maintain speed and power. Under the high compression which results in the creation of a high temperature, the charge in the precombustion chamber is ignited and the heated gases sweep laterally through the restricted, shallow, horizontally tapered passage A, which is rectangular in cross section, into the combustion space S of the cylinder, which it will be noted also contains compressed air, heretofore unimpregnated by oil.

As the fuel charge of heated gas is projected from the precombustion chamber through passage A and into the combustion chamber S the compressed air in this space is also impregnated, whereupon the oxygen of the ignited air in the compression space or combustion chamber S continues the ignition of the fuel. This additional burning of the fuel gases in the compression space adds to the power-pressure and thus the generated pressure is maintained for a longer duration of time than would otherwise be the case, with the result that the power and efficiency of the engine are enhanced.

In Figure 1, the precombustion chamber is lined with a two-piece liner, as differentiated from the structure of Figure 3 where the liner is omitted, the parts of the liner being indicated at 3 and 4. In either event, the precombustion chamber is partially surrounded by air that is supplied to the intake valve and partially by water of the water-cooling system, thus avoiding a wasteful reduction in temperature of the chamber-walls that would be occasioned by the use of a complete water-cooling system. The injector, on the other hand, which is mounted in the engine block, is surrounded by water of the water-cooling system, and thereby maintained in a comparatively cool condition, thus avoiding the possibility of sticking or binding of the valve mechanism, or warping of parts of the injector.

The horizontal passageway A and the compression space S, are in actual practice comparatively shallow, but the outwardly flaring passageway insures a wide discharge and uniform distribution of the comparatively shallow charge of ignited oil and air to sweep through the passageway into the combustion chamber of the cylinder, and as the piston at its top or outer dead center is below this passageway there is at no time any obstruction to prevent the free flow of compressed air in one direction, nor to the sweep of the fuel charge from the precombustion chamber to the combustion chamber in the other direction.

This fired fuel charge and air are restrained by the restricted aperture at the bottom of the precombustion chamber, which restraint produces a controlled moderate pressure from the burning charge of air in the cylinder of the medium-speed engine, prolongs the pressure on the piston on its downward stroke, and produces a higher mean effective pressure throughout the stroke, with a lower initial pressure. In this manner I provide controlled maximum pressures from a comparatively low initial pressure through a higher mean effective pressure throughout the power stroke of the piston, which reduces stress on the working parts of the engine in addition to increasing the efficiency of the engine and enhancing the economical operation of the engine.

In the two-cycle engine of Figure 2 the precombustion chamber has a one-piece insert or liner 5, and in all of the disclosures the upper part of the chamber wall is substantially hemispherical, while the lower portion of the chamber has a tangentially extending face T which serves to guide the compressed air into a swirl as it enters the precombustion chamber, and this same face serves to guide the burning gases as they sweep from the precombustion chamber, beneath the lobe L, through the shallow, tapered, and restricted passage A and into the combustion chamber as previously described for the four-cycle engine.

The injector I of the two cycle engine may be located in the engine head, as indicated, and a glow plug 6 is also indicated in the engine head. In this two-cycle arrangement the charge of air is introduced by a compressor through the engine head inlet passages and valves to the space S at the upper end of the cylinder approximately at the time the piston P, on its down stroke, uncovers the annular series of exhaust ports E' of the cylinder to release the burnt gases through exhaust chamber E2 and the outlet port E3, which are further forced out by the air from the compressor. On the next, up-stroke, of the piston P, the fresh charge of air is compressed in the shallow space S the passage A and the precombustion chamber B, the inlet valves having closed and a charge of oil is injected to produce the power stroke of the piston. By this compact arrangement of the two-cycle engine a minimum in weight of materials and a minimum number of operating parts is accomplished, and a substantial increase in power is also attained as compared with two cycle engines of this type heretofore in use, as well as compared with engines of the four cycle type for high speed Diesel engines.

While I have shown only one cylinder in connection with the engine head and precombustion chamber, it will of course be understood that the invention is employed in multi-cylinder engines, and such engines are adapted for various uses, as in locomotives of the type illustrated in by pending application for patent Ser. No. 655,241, filed February 4, 1933.

By the employment of the liners, which are interchangeable, in the chambered head, it will be apparent that the capacity or size of a precombustion chamber may be varied, and the compression ratio may be thus changed to suit different conditions, as for instance to meet the differences in grades of fuel oil.

These liners or inserts are preferably fashioned of high grade alloy, or other metal that is a good resistant, and these may be employed in an aluminum head. When the liners are omitted as in Figure 3, the walls of the chamber may be fashioned of cast-steel or high grade cast iron.

While I have disclosed various forms of the physical embodiment of my invention, it will be understood that these are exemplifying structures, and that various changes and alterations may be made and are contemplated, in carrying out my invention.

Having thus fully described my invention, what I claim as new and desire to secure by Letters Patent is:—

1. In an internal combustion engine, the combination with a cylinder and piston, of a removable engine-head closing the cylinder, said head having a recess in its under-face forming a space above the dead-center position of the piston, said head also having a precombustion chamber opening through said underface and a shallow passage having side walls flaring laterally from the chamber to the recess, the depressed face of said passage terminating in a lobe projecting partially over said chamber opening into the chamber, and said chamber having a charge-directing inner face terminating at said chamber opening opposite to the lobe.

2. In an internal combustion engine of the compression-ignition type, the combination with an engine block having a cylinder and piston therein, of a removable engine-head having a constantly open cylindrical-space above the dead-center position of the piston, said head also having a spherical pre-combustion chamber located above and at one side of the cylinder, said chamber having an opening through the under-face of the head, said under-face having a shallow passage fashioned with side walls flaring laterally from the chamber-opening to the cylindrical-space, said chamber-opening and passage both terminating at and bounded by the upper edge of the cylinder-block, the upper face of said passage terminating in a lobe located in said chamber and projecting partially over said chamber-opening, said chamber having a charge-directing inner face terminating at the chamber-opening opposite to the lobe, and an oil injector mounted in position for directing a charge through said chamber-opening between said lobe and the charge-directing face.

FRANK B. YINGLING.